Patented Apr. 7, 1936

2,036,663

UNITED STATES PATENT OFFICE

2,036,663

PREPARATION OF ANTHRIMIDE CARBAZOLE DYESTUFFS OF THE ANTHRAQUINONE-ACRIDONE SERIES

Henry J. Weiland, South Milwaukee, and William Dettwyler, Milwaukee, Wis., assignors to E. I. du Pont de Nemours & Company, Wilmington, Del., a corporation of Delaware No Drawing. Application February 12, 1934, Serial No. 710,886

2 Claims. (Cl. 260—37)

This invention relates to an improved process for preparing dyestuffs of the anthrimide carbazole type which contain an acridone ring structure.

Various methods have been disclosed in the prior art for ring-closing di- and poly-anthrimides to the corresponding carbazoles. Among these may be mentioned alkali fusion; heating with sulfuric or chlorosulfonic acids; and treating them with aluminum chloride and a flux such as sodium chloride. A more recent method has been disclosed in which aluminum chloride is used with pyridine, quinoline, etc., which, as stated in U. S. Patent 1,690,236, gives results which cannot be obtained with other diluents. According to U. S. Patent 1,857,232, the aluminum chloride-pyridine fusion was found to be applicable in the preparation of anthrimide carbazoles containing the acridone ring structure. According to this patent, anthrimide compounds containing the acridone ring structure could also be ring-closed with aluminum chloride or aluminum chloride and sodium chloride, etc.

We have now found that anthrimide compounds containing the acridone ring structure can be readily and conveniently ring-closed with aluminum chloride in nitrobenzene to give good yields of a high-grade anthrimide carbazole dyestuff. While the use of aluminum chloride in nitrobenzene for ring-closing benzoylamino substituted anthromides has been disclosed in German Patent 566,708, it was not obvious from this disclosure that anthrimides containing the acridone nucleus could be ring-closed in the same manner, particularly in view of the statements found in U. S. Patent 1,690,236 and the process outlined in U. S. Patent 1,857,232.

It has also been found that by the use of nitrobenzene and aluminum chloride for effecting the ring-closure of our acridone substituted anthrimides, it is possible to combine the preparation of the anthrimide and the ring-closure to the carbazole compound into a single process, thereby dispensing with the necessity of isolating the intermediate anthrimide.

It is therefore an object of this invention to prepare anthraquinone anthrimide carbazoles containing an acridone nucleus by ring-closing the anthrimide compounds containing at least one benzacridone group with aluminum chloride in nitrobenzene, whereby the carbazole compounds may be prepared directly from chloro or amino anthraquinone benzacridone and amino or chloro anthraquinones without isolation of the intermediate anthrimide compounds.

The following examples will serve to more fully describe our invention, it being understood that these examples are given only for the purpose of illustrating and not as limitations upon our invention. Parts given are parts by weight.

Example 1

To 200 parts of dry nitrobenzene add 50 parts of freshly ground aluminum chloride and 20 parts of powdered trianthrimide of the following formula:

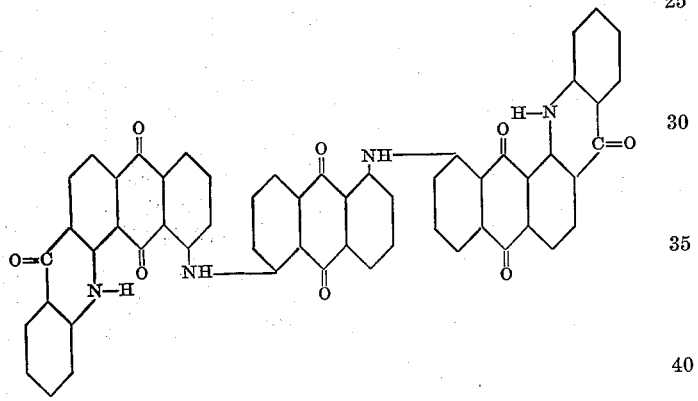

(obtained by condensation of 2 mols of 8-aminoanthraquinone 2,1-benzacridone and 1 mol of 1,5-dichloro-anthraquinone). Heat the mixture to 125–130° C. and maintain at this temperature for 5 hours. The first green colored solution turns gradually to a violet and becomes darker. When no more change in color is noticeable, pour the hot melt into 1000 parts of cold water and remove the nitrobenzene by steam distillation, filter and wash free of salts and dry in the usual manner.

The crude dyestuff may be purified by any of the known methods, crystallization as oxonium salt or by oxidation with chromic acid or bleaching solution. The shade obtained is considerably brighter than obtainable with the dry fusion with aluminum chloride and salt, and the yield is considerably higher.

Example 2

Mix 200 parts of dry nitrobenzene, 50 parts of freshly ground aluminum chloride and 20 parts of dianthrimide (obtained from 1 mol of 8-amino-anthraquinone-2,1-benzacridone and 1 mol of 1-chloro-anthraquinone). Heat the mixture to 120–125° C. and hold at this temperature for 5–8 hours. The green solution will change to a violet as the reaction progresses. When this is complete pour the melt into 1000 parts of cold water and steam distill free of nitrobenzene, filter, wash free of salts and dry.

The crude dyestuff consists of a dark brown powder, soluble in sulfuric acid with a brownish-red color. It may be purified by any of the known methods and gives clearer shades of brown than obtainable by the dry fusion previously described.

Example 3

Charge into 500 parts of dry nitrobenzene, 30 parts of 8-amino-anthraquinone-2,1-benzacridone, 13.5 parts of 1,5-dichloro-anthraquinone, 10 parts of soda ash, and 2 parts of cuprous chloride. Heat to reflux temperature and keep a slight reflux for 12–16 hours. Then allow the condensation mass to cool to room temperature, at which point 100 parts of freshly ground aluminum chloride are added over a period of ¼ to ½ hour. The temperature will rise up to 60–70° C. Then heat up to 125–130° C. and hold this temperature for 5 hours and work up the same way as in Example 1.

Example 4

Add to a suspension of 25 parts of trichloro-anthraquinone-benzacridone (made by chlorination of 2,1-anthraquinone-benzacridone in nitrobenzene), 300 parts of nitrobenzene, 13 parts of 1-amino-anthraquinone, 8 parts of soda ash and 2 parts of cuprous chloride. Heat the whole to 205° C. Maintain at this temperature for 20 hours and then cool to 20–25° C. Then add gradually over a period of ½ hour 100 parts of ground aluminum chloride, letting the temperature rise to 50–60°. Then heat to 125–130° and hold 5 hours. The first green mass becomes gradually dark colored. Pour the hot reaction mass into 1000 parts of cold water and remove the nitrobenzene with steam. Filter, wash free of salt, and dry.

The product is a black powder, soluble in concentrated sulfuric acid with a red-violet color, and dyes cotton a yellowish-khaki shade from a yellow-brown vat. It is identical with the compound made by aluminum chloride salt fusion of the dianthrimide from trichloroanthraquinone benzacridone and 1-amino-anthraquinone. It may be further purified by any known means, as for example, by fractional crystallization or oxidation with dilute chromic acid.

Example 5

Condense in the usual manner 25 parts of trichloro-anthraquinone-benzacridone (obtained as above mentioned) with 7 parts of 1,5-diamino-anthraquinone in the presence of 5 parts of soda ash and 1 part of cuprous chloride, in 300 parts of nitro-benzene. Cool the finished condensation mass to 20–25° and add gradually 100 parts of ground aluminum chloride. Then heat to 125–128° C. and hold at this temperature for 5 hours. Then pour into 1000 parts of cold water and steam distil free of nitrobenzene, filter and wash. The dyestuff consists of a black powder, soluble in concentrated sulfuric acid with a reddish-blue color, and dyes cotton brown with a violet cast from a brown vat.

In the processes above described, iron chloride may be used in place of the aluminum chloride specifically mentioned, and is to be construed as an equivalent thereof. The amounts of nitrobenzene and aluminum chloride and the temperatures used in the ring-closure of the dianthrimide compound may be varied within reasonable limits, those given in the examples being preferred, it being of course understood that the higher temperatures used in the known aluminum chloride fusions may be used in this process, although no advantage is gained by the use of such high temperatures. Temperatures under 120° may be used by increasing the time of the reaction. The preparation of the anthrimides from the halogen or amino anthraquinone benzacridones and amino or halogen anthraquinone compounds in nitrobenzene may be carried out in any of the known methods described in the prior art.

Where in the claims the expression "an anthrimide compound which contains at least one benzacridone group" is used, it is intended to cover di- or poly-anthrimides in which one or more of the anthraquinone radicals contains a benzacridone group.

We claim:

1. In the preparation of anthrimide carbazole dyestuffs the step which comprises heating an anthrimide which contains at least one anthraquinone benzacridone group with aluminum chloride in nitrobenzene.

2. The process which comprises heating the compound of the formula

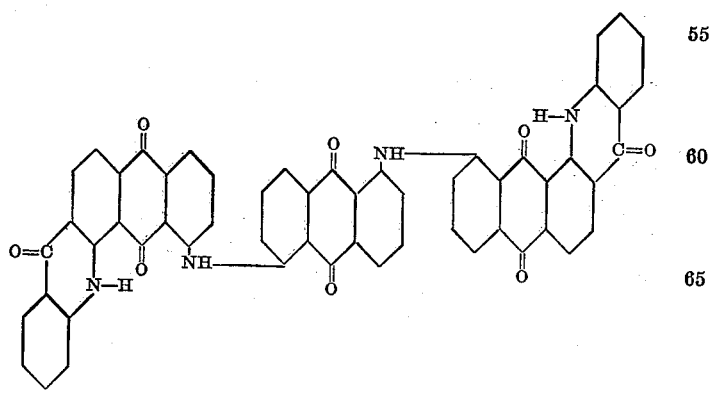

with aluminum chloride in nitrobenzene to produce the corresponding anthrimide-carbazole dyestuff.

HENRY J. WEILAND.
WILLIAM DETTWYLER.